(12) United States Patent
Leighton

(10) Patent No.: US 12,275,290 B2
(45) Date of Patent: Apr. 15, 2025

(54) REVERSIBLE HEATING AND COOLING DEVICE

(71) Applicant: Jeffery Leighton, St Louis, MO (US)

(72) Inventor: Jeffery Leighton, St Louis, MO (US)

( * ) Notice: Subject to any disclaimer, the term of this patent is extended or adjusted under 35 U.S.C. 154(b) by 247 days.

(21) Appl. No.: 18/126,978

(22) Filed: Mar. 27, 2023

(65) Prior Publication Data

US 2024/0326557 A1     Oct. 3, 2024

(51) Int. Cl.
*B60H 1/00* (2006.01)
*B60H 1/32* (2006.01)

(52) U.S. Cl.
CPC ..... *B60H 1/00907* (2013.01); *B60H 1/00535* (2013.01); *B60H 1/00564* (2013.01); *B60H 1/32284* (2019.05)

(58) Field of Classification Search
CPC ............ B60H 1/00907; B60H 1/00535; B60H 1/0055; B60H 1/32284; B60H 1/00899; B60H 2001/00307
See application file for complete search history.

(56) References Cited

U.S. PATENT DOCUMENTS

| | | | |
|---|---|---|---|
| 4,909,044 A | 3/1990 | Gudmundsen | |
| 7,024,876 B1 | 4/2006 | Kishek | |
| 7,814,764 B1 | 10/2010 | Heater | |
| 8,316,650 B2 | 11/2012 | Yang | |
| D854,588 S | 7/2019 | Black | |
| 2006/0156738 A1 | 7/2006 | Khalil | |
| 2015/0027160 A1 | 1/2015 | Callahan | |
| 2016/0047559 A1* | 2/2016 | Swanson | F24F 1/04 62/401 |
| 2016/0370020 A1 | 12/2016 | Morgan | |
| 2018/0370322 A1* | 12/2018 | Filipkowski | B60H 1/0055 |
| 2021/0323375 A1* | 10/2021 | Kim | B60H 1/3228 |
| 2022/0314731 A1* | 10/2022 | Lee | B60H 1/00028 |
| 2022/0402328 A1* | 12/2022 | Kim | B60H 1/00535 |

FOREIGN PATENT DOCUMENTS

CA     2492902     1/2005

* cited by examiner

*Primary Examiner* — Marc E Norman

(57) ABSTRACT

A reversible heating and cooling device for temperature control of a passenger compartment of a vehicle includes a housing, which is mountable within an aperture that is in a dash of a vehicle. A heat pump is attached within the housing. A selector is attached to the housing enables to selectively actuate a battery to power the heat pump in a first mode and a second mode. In the first mode, heat is pumped into the engine compartment, whereas, in the second mode, heat is pumped into the passenger compartment. The heat pump can be used to selectively cool and heat the passenger compartment.

15 Claims, 7 Drawing Sheets

REVERSIBLE HEATING AND COOLING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to heat pumps and more particularly pertains to a new heat pump for temperature control of a passenger compartment of a vehicle. The present invention discloses a heat pump for use in preheating or precooling a passenger compartment of a vehicle prior to entry by a user.

(2) Description of Related Art Including Information Disclosed Under 37 CFR 1.97 and 1.98

The prior art relates to heat pumps, which may comprise solar powered Peltier coolers and ducted portable air conditioners for vehicles. U.S. Pat. No. 7,024,876 and U.S. Patent Application 2016/0370020 disclose solar powered and battery powered cooling devices, respectively, that are purported to cool a passenger compartment of a vehicle but which do not disclose means of transferring heat from the passenger compartment. Related prior art comprises propane powered personal cooling devices. What is lacking in the prior art is a heat pump configured for mounting to a dash of a vehicle, wherein the heat pump is configured to selectively pump heat between an engine compartment and passenger compartment of the vehicle.

BRIEF SUMMARY OF THE INVENTION

An embodiment of the disclosure meets the needs presented above by generally comprising a housing, which defines an interior space and which is configured for selective partial insertion, by its first end, into an aperture that is in a dash of a vehicle. A wall is attached to the housing and defines a pair of compartments within the interior space. A plurality of slots is positioned in the housing and defines a pair of intake vents and a pair of outlet vents, with each compartment having an intake vent and an outlet vent. The housing is removably mounted to the dash with the first end and a second end of the housing protruding into an engine compartment and a passenger compartment of the vehicle, respectively.

A battery and a heat pump are attached to the housing and are positioned in the interior space, with the latter being operationally engaged to the former. The heat pump comprises a pair of heat exchangers and a pair of fans, with each compartment containing a respective heat exchanger and a respective fan. Each fan is positioned to motivate air through a respective compartment and a respective heat exchanger that is positioned in the respective compartment. A selector is attached to the housing and is operationally engaged to the battery and the heat pump. The selector is enabled to selectively actuate the battery to power the heat pump in a first mode and a second mode. In the first mode, heat is pumped into the engine compartment, whereas, in the second mode, heat is pumped into the passenger compartment. The heat pump thus is configured to selectively cool and heat the passenger compartment.

Another embodiment of the disclosure includes a reversible heating and cooling system, which comprises a vehicle having a dash in which an aperture is positioned. The aperture opens into an engine compartment of the vehicle and a reversible heating and cooling device, according to the disclosure above, has been inserted by its first end into the aperture. A second end of the housing protrudes into a passenger compartment of the vehicle The heat pump of the reversible heating and cooling device is configured to selectively cool and heat the passenger compartment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
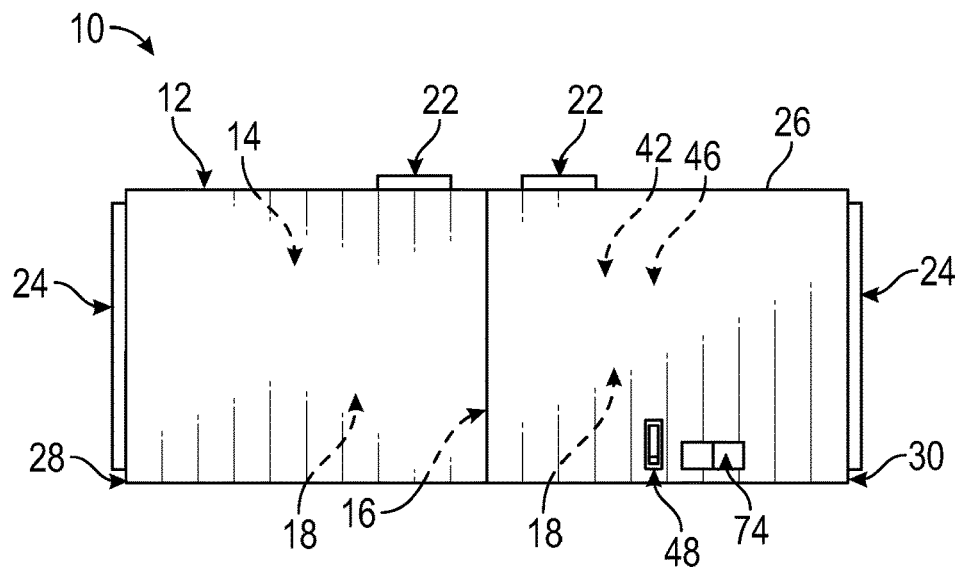
FIG. 1 is a side view of a reversible heating and cooling device according to an embodiment of the disclosure.

With reference now to the drawings, and in particular to FIGS. 1 through 10 thereof, a new heat pump embodying the principles and concepts of an embodiment of the disclosure and generally designated by the reference numeral 10 will be described.

Figure 2:
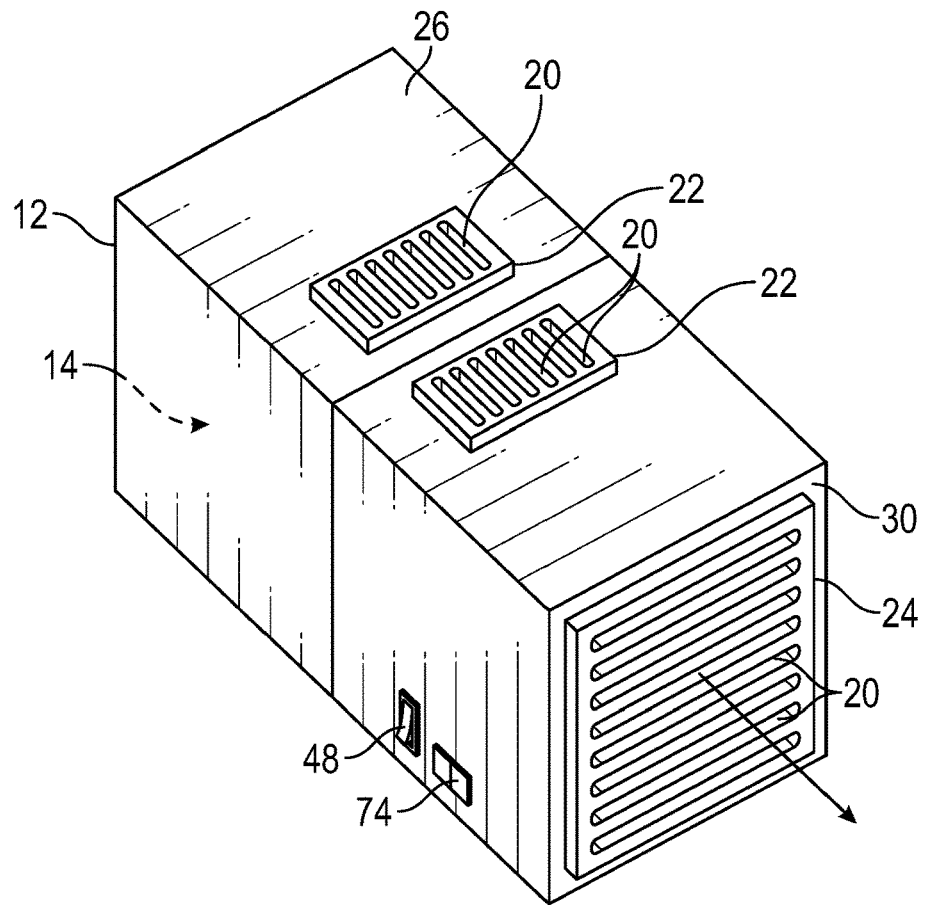
FIG. 2 is a top isometric perspective view of an embodiment of the disclosure.
Figure 3:
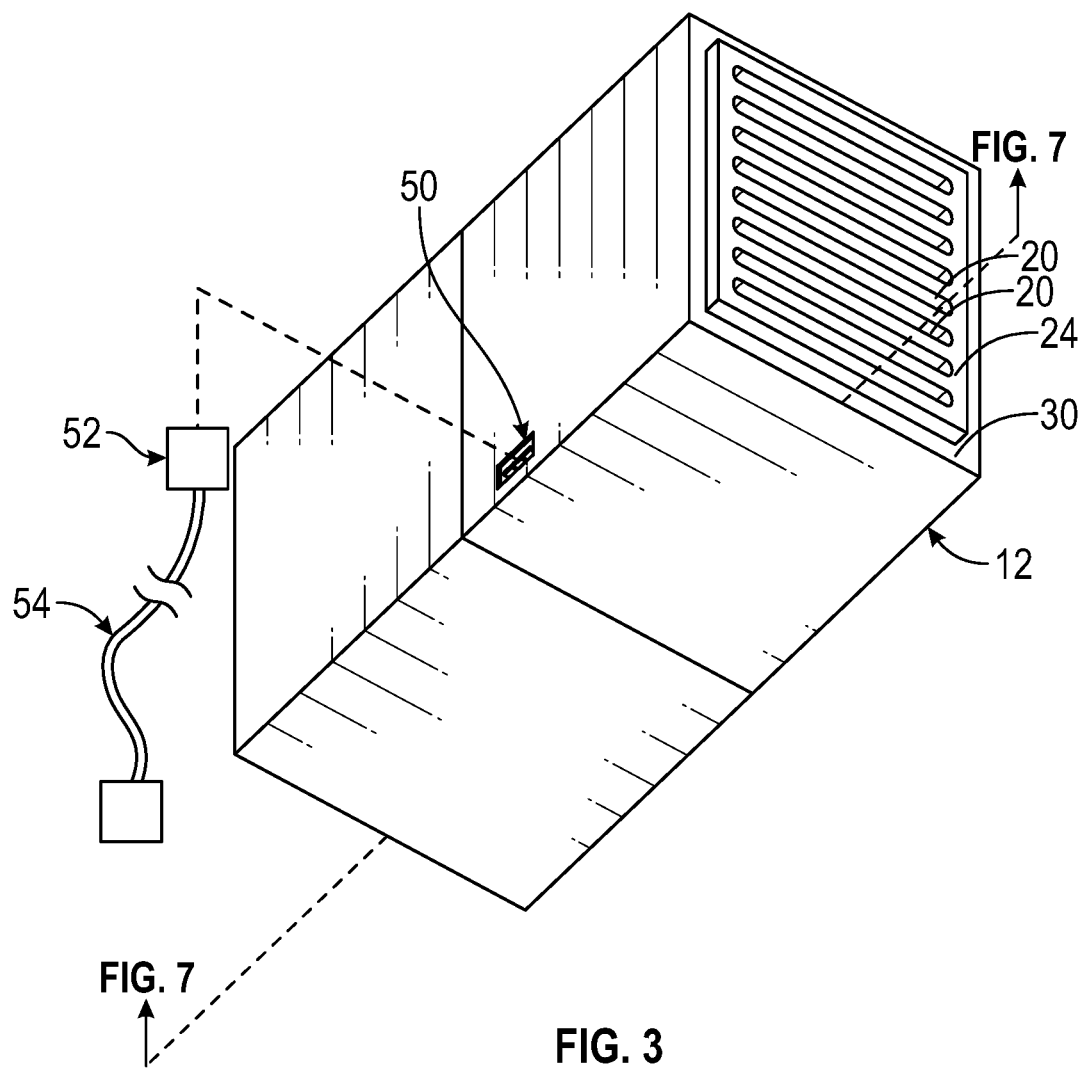
FIG. 3 is a bottom isometric perspective view of an embodiment of the disclosure.
Figure 7:
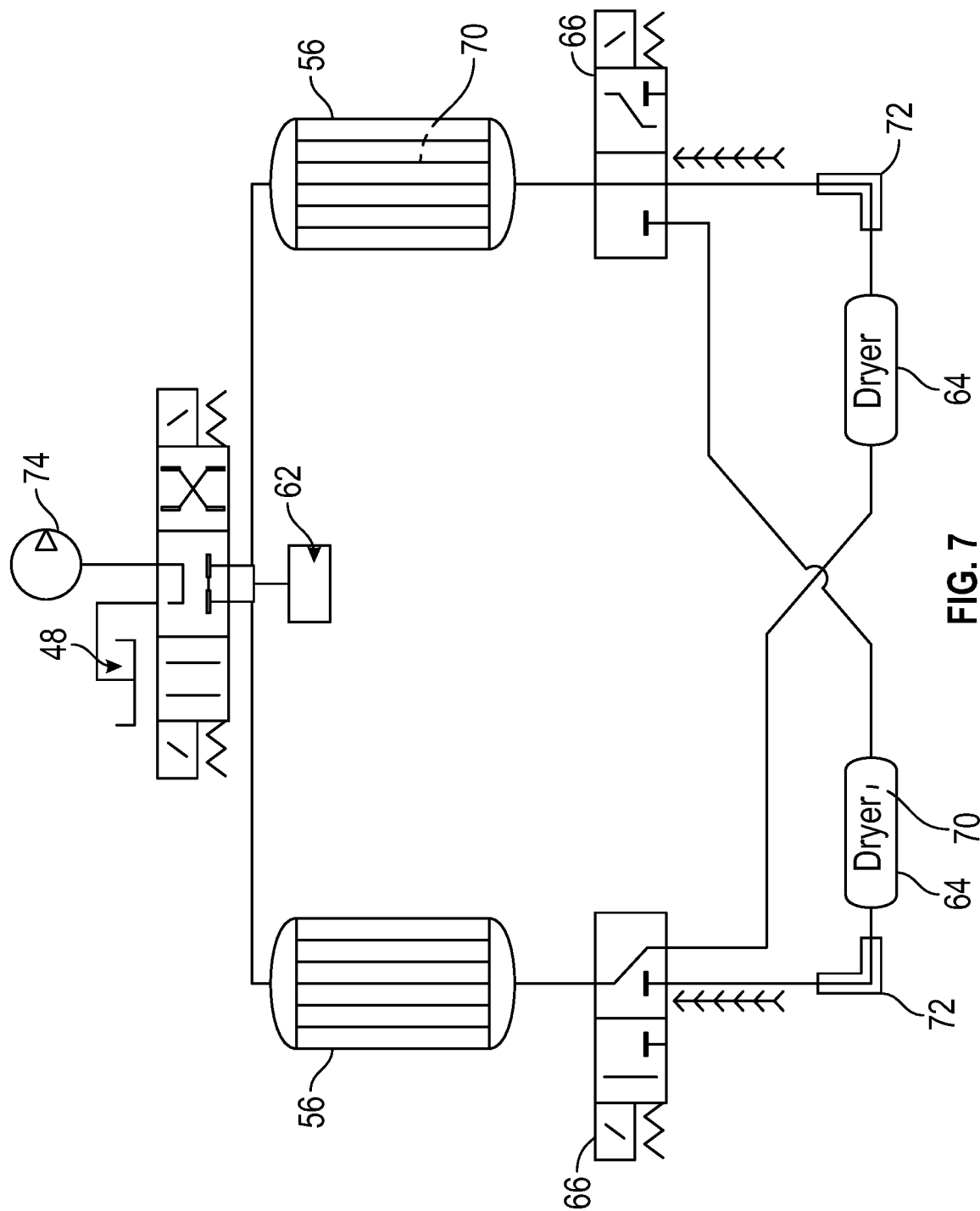
FIG. 7 is a block diagram of an embodiment of the disclosure.
Figure 8:
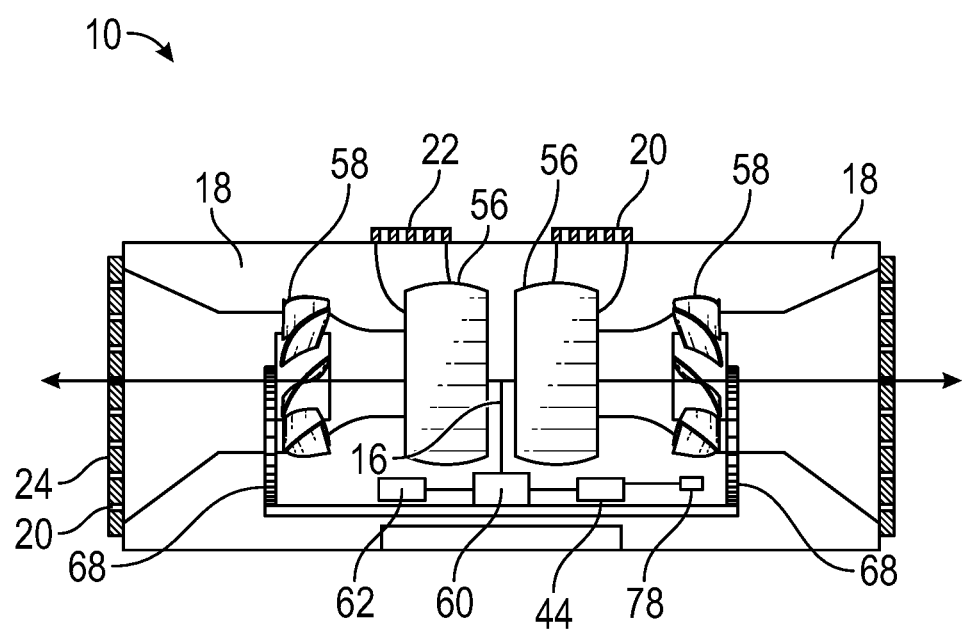
FIG. 8 is a cross-sectional view of an embodiment of the disclosure.

As best illustrated in FIGS. 1 through 10, the reversible heating and cooling device 10 generally comprises a housing 12, which defines an interior space 14. As shown in FIGS. 1-3, the housing 12 is substantially cuboid, although the present invention also anticipates the housing 12 being alternatively shaped, such as, but not limited to, cylindrical, polyhedric, or the like. As shown in FIG. 7, a wall 16 is attached to the housing 12 and defines a pair of compartments 18 within the interior space 14.

Figure 4:
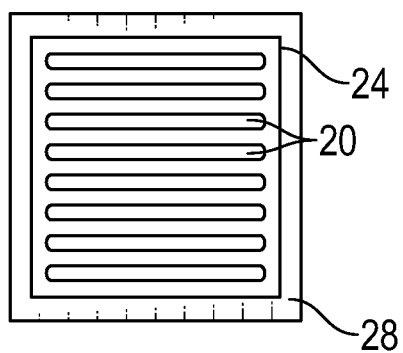
FIG. 4 is an end view of an embodiment of the disclosure.
Figure 5:
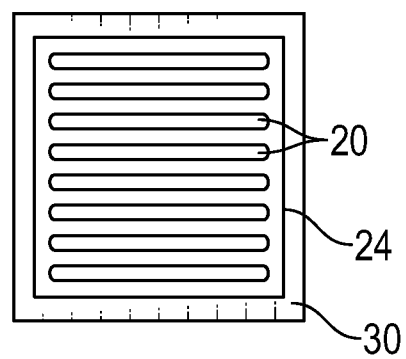
FIG. 5 is an end view of an embodiment of the disclosure.
Figure 6:
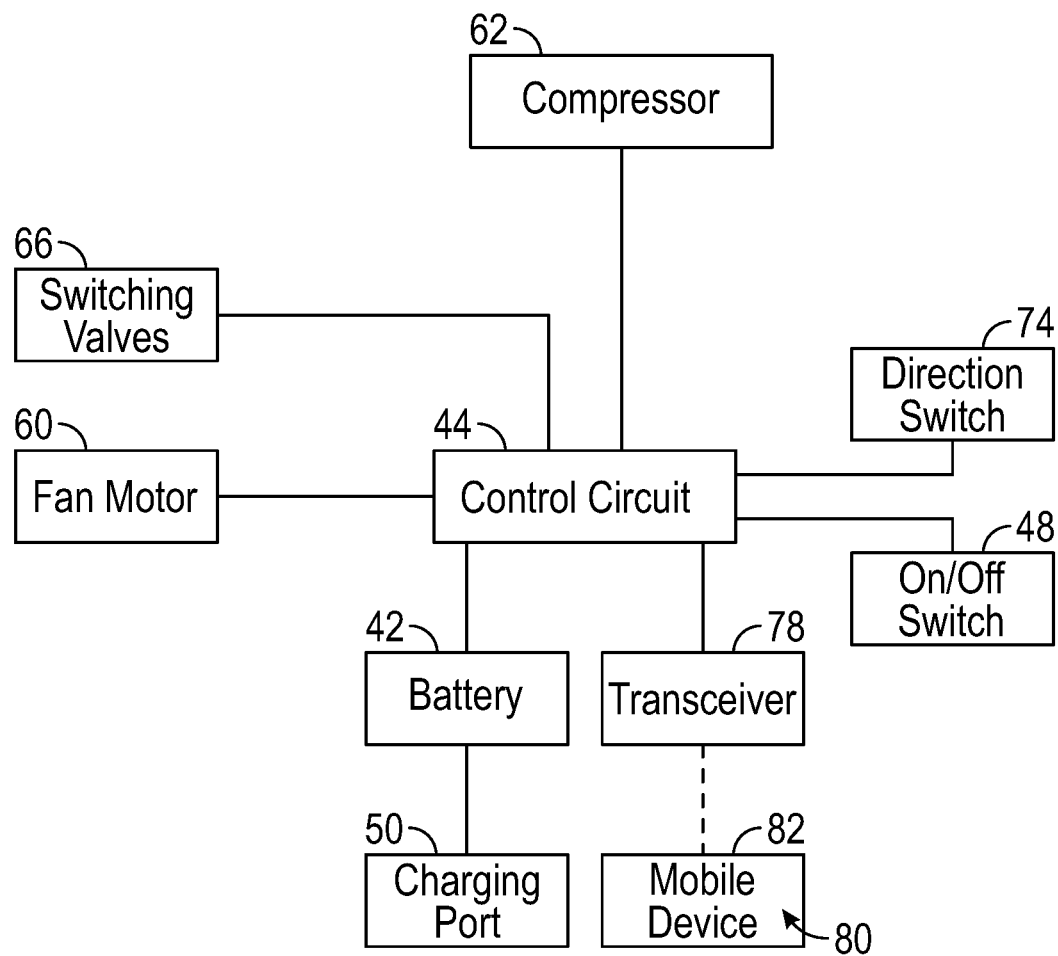
FIG. 6 is a block diagram of an embodiment of the disclosure.

A plurality of slots 20 is positioned in the housing 12 and defines a pair of intake vents 22 and a pair of outlet vents 24, with each compartment 18 having an intake vent 22 and an outlet vent 24. As shown in FIGS. 2 and 7, the intake vents 22 are positioned in a top 26 of the housing 12 and bracket the wall 16. As shown in FIGS. 4 and 5, the outlet vents 24 are positioned in a first end 28 and a second end 30 of the housing 12. Alternative positioning of the intake vents 22 and the outlet vents 24 is anticipated by the present invention, with the proviso that each compartment 18 has an intake vent 22 and an outlet vent 24.

Figure 9:
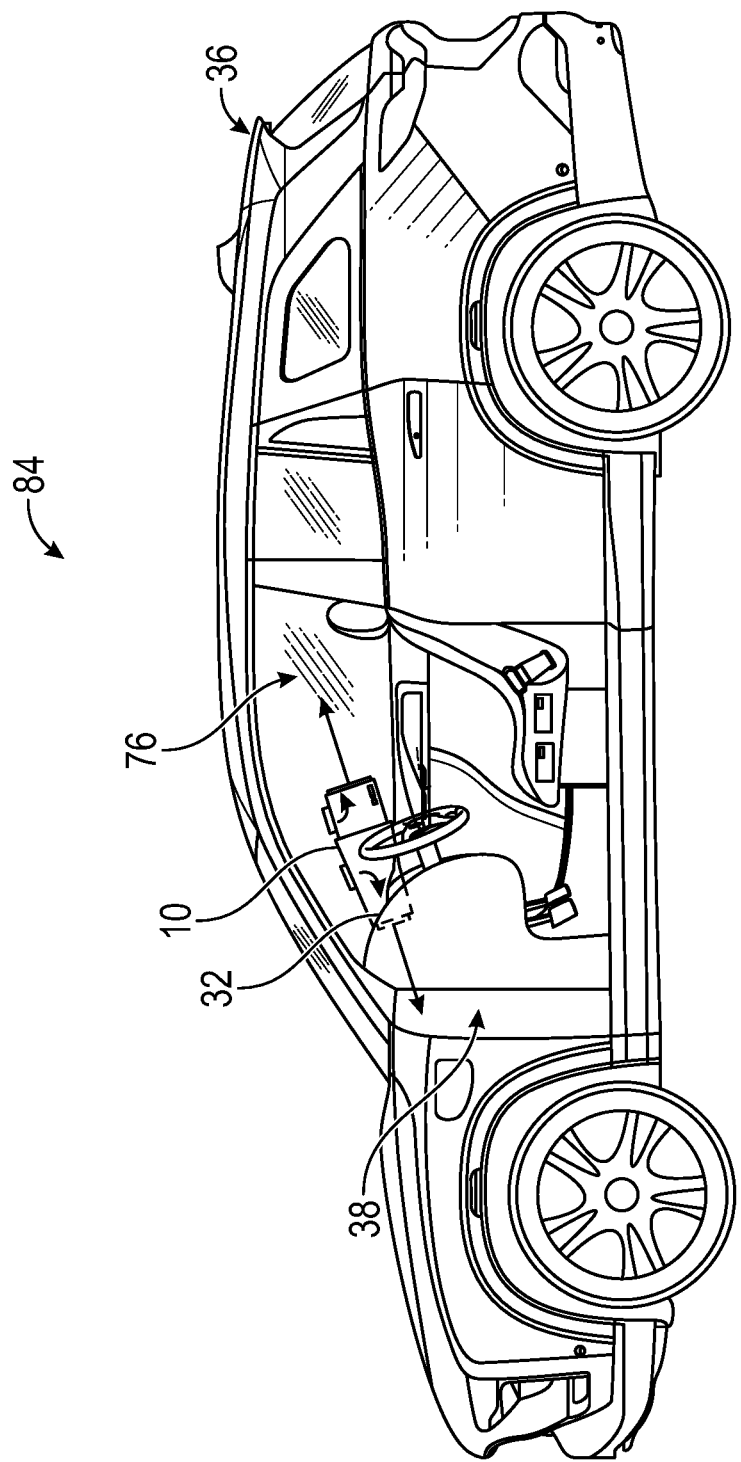
FIG. 9 is an in-use view of an embodiment of the disclosure.

The housing 12 is configured for selective partial insertion, by its first end 28, into an aperture 32 that is in a dash 34 of a vehicle 36 so that the housing 12 is removably mounted to the dash 34 with the first end 28 and the second end 30 of the housing 12 protruding into an engine compartment 38 and a passenger compartment 76 of the vehicle 36, respectively. The mounting of the housing 12 to the dash 34 is depicted in FIG. 9, wherein the vehicle 36 comprises a passenger car 40. The present invention also anticipates the vehicle 36 comprising trucks, tractors, heavy equipment, or the like. Additionally, the present invention anticipates the housing 12 being mounted to the vehicle 36 such that the first end 28 is positioned in an ambient environment around the vehicle 36.

A battery 42, a microprocessor 44, and a heat pump 46 are attached to the housing 12 and are positioned in the interior space 14. A power switch 48, which is attached to the housing 12 and which is operationally engaged to the microprocessor 44, is configured to be selectively switched to power the heat pump 46. The battery 42 is rechargeable by means of a port 50, which is attached to the housing 12 and which is operationally engaged to the microprocessor 44. The port 50 is configured for insertion of a plug 52 of a charging cord 54 to operationally engage the battery 42 to a source of electrical current to charge the battery 42. For example, the charging cord 54 could engage the battery 42 to a Universal Serial Bus port or automobile auxiliary power outlet, thereby charging the battery 42 only when the vehicle 36 is running.

The heat pump 46 and the microprocessor 44 are operationally engaged to the battery 42. The heat pump 46 comprises a pair of heat exchangers 56, a pair of fans 58, a motor 60, a compressor 62, a pair of expansion valves 64, a pair of switching valves 66. The motor 60 is operationally engaged to the microprocessor 44. A gear train 68, a belt, a chain, or the like, is operationally engaged to the motor 60 and to the pair of fans 58 so that the microprocessor 44 is enabled to selectively actuate the motor 60 to rotate the fans 58 to motivate air through the heat exchangers 56. The compressor 62 is operationally engaged to the microprocessor 44 and to the pair of heat exchangers 56 so that the compressor 62 is in fluidic communication with the heat exchangers 56. As per prior art heat pumps, the compressor 62 is used to compress a refrigerant 70, which is positioned in the heat pump 46, as part of a refrigeration cycle.

Each expansion valve 64 is operationally engaged to the pair of heat exchangers 56 so that the expansion valve 64 is in fluidic communication with both of the heat exchangers 56. Each switching valve 66 is operationally engaged the pair of heat exchangers 56 and to the pair of expansion valves 64 so that the microprocessor 44 is enabled to selectively actuate the pair of switching valves 66 to reverse a direction of flow of the refrigerant 70. Reversing the direction of flow of the refrigerant 70 effectively reverses the heat pump 46.

The heat pump 46 also may comprise a pair of dryers 72, with each dryer 72 being operationally engaged to a respective expansion valve 64 and to a respective heat exchanger 56. The dryers 72 remove contaminants, such as moisture and dirt, from the refrigerant 70. Each compartment 18 contains a respective heat exchanger 56 and a respective fan 58. Therefore, each fan 58 is positioned to motivate air through a respective compartment 18 and a respective heat exchanger 56 that is positioned in the respective compartment 18.

Figure 10:
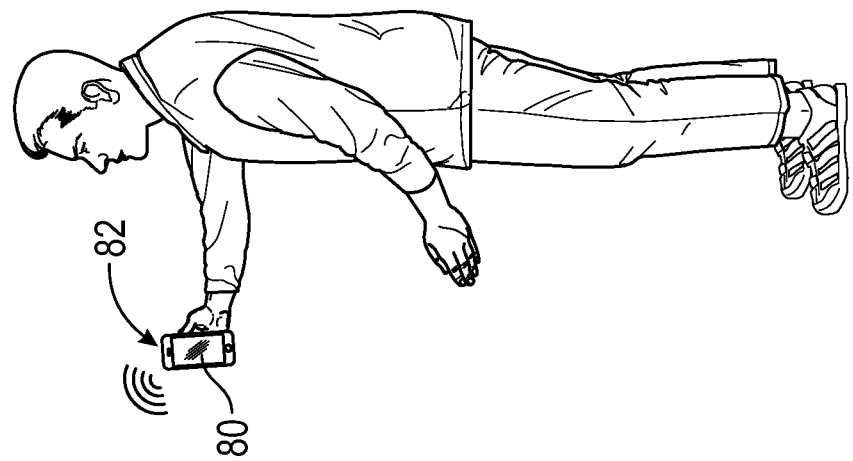
FIG. 10 is an in-use view of an embodiment of the disclosure.
Figure 10:
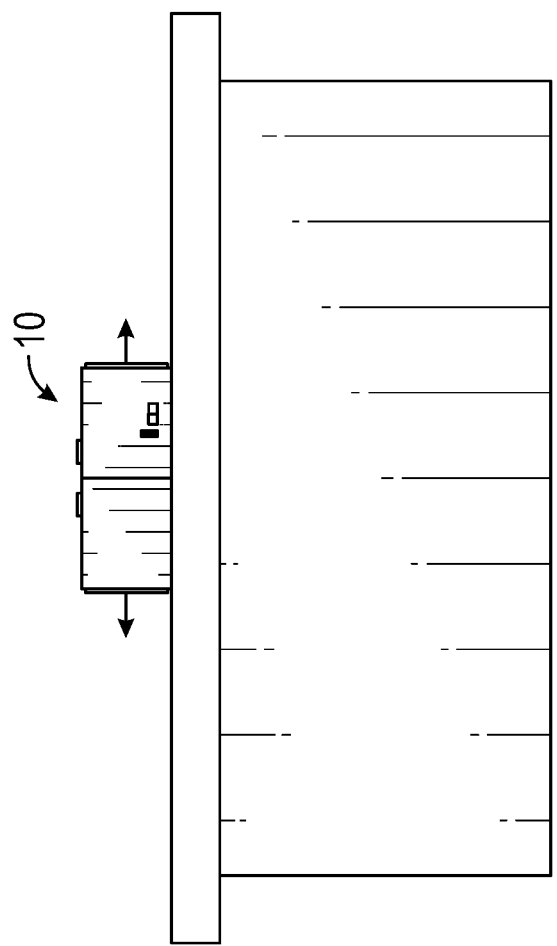

A selector 74 is attached to the housing 12 and is operationally engaged to the battery 42 and the heat pump 46. The selector 74 is enabled to selectively actuate the battery 42 to power the heat pump 46 in a first mode and a second mode. In the first mode, heat is pumped into the engine compartment 38, whereas in the second mode heat is pumped into the passenger compartment 76. The selector 74 may comprise a toggle switch, a slide switch, or the like, which is attached to the housing 12 and operationally engaged to the microprocessor 44, and thus configured to be switched to signal the microprocessor 44 to selectively actuate the pair of switching valves 66. The heat pump 46 thus is configured to selectively cool and heat the passenger compartment 76. As is shown in FIG. 10, the present invention also anticipates the reversible heating and cooling device 10 being used for personal cooling and heating.

The reversible heating and cooling device 10 also may comprise a transceiver 78, which is attached to the housing 12, positioned in the interior space 14, and operationally engaged to the microprocessor 44. Programming code 80, which is selectively positionable on an electronic device 82 of a user, enables the electronic device 82 to signal the microprocessor 44, via the transceiver 78, to power up the heat pump 46 to selectively cool and heat the passenger compartment 76.

The present invention also anticipates a reversible heating and cooling system 84, which comprises a vehicle 36 having a dash 34 in which an aperture 32 is positioned. The aperture 32 opens into an engine compartment 38 of the vehicle 36 and a reversible heating and cooling device 10, according to the specification above, has been inserted by its first end 28 into the aperture 32. A second end 30 of the housing 12 protrudes into a passenger compartment 76 of the vehicle 36. The heat pump 46 of the reversible heating and cooling device 10 is configured to selectively cool and heat the passenger compartment 76.

In use, the housing 12 is mounted within an aperture 32 that is in a dash 34 of a vehicle 36. The selector 74 is used to selectively actuate the battery 42 to power the heat pump 46 in the first mode, when cooling of the passenger compartment 76 is desired, or the second mode, when heating of the passenger compartment 76 is desired. The present invention is anticipated to be useful in preheating or precooling the passenger compartment 76, prior to entry, without depleting a primary battery of the vehicle 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A reversible heating and cooling device comprising:
   a housing defining an interior space and configured for selective partial insertion by a first end into an aperture in a dash of a vehicle, such that the housing is removably mounted to the dash with the first end and a second end of the housing protruding into an engine compartment and a passenger compartment of the vehicle, respectively;
   a battery attached to the housing and positioned in the interior space;
   a heat pump attached to the housing, positioned in the interior space, and operationally engaged to the battery, the heat pump comprising:
      a pair of heat exchangers, and
      a pair of fans;
   a wall attached to the housing and defining a pair of compartments within the interior space, such that each compartment contains a respective heat exchanger of the pair of heat exchangers and a respective fan of the pair of fans;
   a plurality of slots positioned in the housing defining a pair of intake vents and a pair of outlet vents, such that each compartment of the pair of compartments has an intake vent and an outlet vent, such that each fan is positioned for motivating air through a respective compartment and a respective heat exchanger positioned in the respective compartment; and
   a selector attached to the housing and operationally engaged to the battery and the heat pump, such that the selector is enabled for selectively actuating the battery for powering the heat pump in a first mode and a second mode, wherein heat is pumped into the engine compartment and into the passenger compartment, respectively, wherein the heat pump is configured for selectively cooling and heating the passenger compartment.

2. The reversible heating and cooling device of claim 1, wherein the housing is substantially cuboid.

3. The reversible heating and cooling device of claim 1, further including:
   a microprocessor operationally engaged to the battery;
   a power switch attached to the housing and operationally engaged to the microprocessor, wherein the power switch is configured for being selectively switched for powering the heat pump;
   a motor operationally engaged to the microprocessor;
   a compressor operationally engaged to the microprocessor and the pair of heat exchangers, such that the compressor is in fluidic communication with the heat exchangers of the pair of heat exchangers;
   a pair of expansion valves, each expansion valve of the pair of expansion valves being operationally engaged to the pair of heat exchangers, such that the expansion valve is in fluidic communication with both of the heat exchangers of the pair of heat exchangers;
   a pair of switching valves, each switching valve of the pair of switching valves being operationally engaged the pair of heat exchangers and to the pair of expansion valves, such that the microprocessor is enabled for selectively actuating the pair of switching valves for reversing a direction of flow of a refrigerant positioned in the heat pump; and
   a gear train operationally engaged to the motor and to the pair of fans, such that the microprocessor is enabled for selectively actuating the motor for rotating the fans of the pair of fans for motivating air through the heat exchangers.

4. The reversible heating and cooling device of claim 3, further including a pair of dryers, each dryer of the pair of dryers being operationally engaged to a respective expansion valve of the pair of expansion valves and to a respective heat exchanger of the pair of heat exchangers.

5. The reversible heating and cooling device of claim 3, further including:
   the battery being rechargeable; and
   a port attached to the housing and operationally engaged to the microprocessor, such that the port is configured for insertion of a plug of a charging cord for operationally engaging the battery to a source of electrical current for charging the battery.

6. The reversible heating and cooling device of claim 3, further including:
   a transceiver attached to the housing, positioned in the interior space, and operationally engaged to the microprocessor; and
   programming code selectively positionable on an electronic device of a user enabling the electronic device for signaling the microprocessor, via the transceiver, for powering up the heat pump for selectively cooling and heating the passenger compartment.

7. The reversible heating and cooling device of claim 1, wherein:
   the intake vents are positioned in a top of the housing and bracket the wall; and
   the outlet vents are positioned in the first end and the second end of the housing.

8. A reversible heating and cooling device comprising:
   a housing defining an interior space and configured for selective partial insertion by a first end into an aperture in a dash of a vehicle, such that the housing is removably mounted to the dash with the first end and a second end of the housing protruding into an engine compartment and a passenger compartment of the vehicle, respectively, the housing being substantially cuboid;
a battery attached to the housing and positioned in the interior space, the battery being rechargeable;
a heat pump attached to the housing, positioned in the interior space, and operationally engaged to the battery, the heat pump comprising:
a pair of heat exchangers,
a pair of fans,
a microprocessor operationally engaged to the battery,
a power switch attached to the housing and operationally engaged to the microprocessor, wherein the power switch is configured for being selectively switched for powering the heat pump,
a motor operationally engaged to the microprocessor,
a compressor operationally engaged to the microprocessor and the pair of heat exchangers, such that the compressor is in fluidic communication with the heat exchangers of the pair of heat exchangers,
a pair of expansion valves, each expansion valve of the pair of expansion valves being operationally engaged to the pair of heat exchangers, such that the expansion valve is in fluidic communication with both of the heat exchangers of the pair of heat exchangers,
a pair of switching valves, each switching valve of the pair of switching valves being operationally engaged the pair of heat exchangers and to the pair of expansion valves, such that the microprocessor is enabled for selectively actuating the pair of switching valves for reversing a direction of flow of a refrigerant positioned in the heat pump,
a gear train operationally engaged to the motor and to the pair of fans, such that the microprocessor is enabled for selectively actuating the motor for rotating the fans of the pair of fans for motivating air through the heat exchangers, and
a pair of dryers, each dryer of the pair of dryers being operationally engaged to a respective expansion valve of the pair of expansion valves and to a respective heat exchanger of the pair of heat exchangers;
a wall attached to the housing and defining a pair of compartments within the interior space, such that each compartment contains a respective heat exchanger of the pair of heat exchangers and a respective fan of the pair of fans;
a plurality of slots positioned in the housing defining a pair of intake vents and a pair of outlet vents, such that each compartment of the pair of compartments has an intake vent and an outlet vent, such that each fan is positioned for motivating air through a respective compartment and a respective heat exchanger positioned in the respective compartment, the intake vents being positioned in a top of the housing and bracketing the wall, the outlet vents being positioned in the first end and the second end of the housing;
a port attached to the housing and operationally engaged to the microprocessor, such that the port is configured for insertion of a plug of a charging cord for operationally engaging the battery to a source of electrical current for charging the battery;
a selector attached to the housing and operationally engaged to the battery and the heat pump, such that the selector is enabled for selectively actuating the battery for powering the heat pump in a first mode and a second mode, wherein heat is pumped into the engine compartment and into the passenger compartment, respectively, wherein the heat pump is configured for selectively cooling and heating the passenger compartment;
a transceiver attached to the housing, positioned in the interior space, and operationally engaged to the microprocessor; and
programming code selectively positionable on an electronic device of a user enabling the electronic device for signaling the microprocessor, via the transceiver, for powering up the heat pump for selectively cooling and heating the passenger compartment.

9. A reversible heating and cooling system comprising:
a vehicle comprising a dash in which an aperture is positioned, the aperture opening into an engine compartment of the vehicle; and
a reversible heating and cooling device comprising:
a housing defining an interior space, the housing being partial inserted by a first end into the aperture, such that the housing is mounted to the dash with the first end and a second end of the housing protruding into the engine compartment and a passenger compartment of the vehicle, respectively,
a battery attached to the housing and positioned in the interior space,
a heat pump attached to the housing, positioned in the interior space, and operationally engaged to the battery, the heat pump comprising:
a pair of heat exchangers, and
a pair of fans,
a wall attached to the housing and defining a pair of compartments within the interior space, such that each compartment contains a respective heat exchanger of the pair of heat exchangers and a respective fan of the pair of fans,
a plurality of slots positioned in the housing defining a pair of intake vents and a pair of outlet vents, such that each compartment of the pair of compartments has an intake vent and an outlet vent, such that each fan is positioned for motivating air through a respective compartment and a respective heat exchanger positioned in the respective compartment, and
a selector attached to the housing and operationally engaged to the battery and the heat pump, such that the selector is enabled for selectively actuating the battery for powering the heat pump in a first mode and a second mode, wherein heat is pumped into the engine compartment and into the passenger compartment, respectively, wherein the heat pump is configured for selectively cooling and heating the passenger compartment.

10. The reversible heating and cooling system of claim 9, wherein the housing is substantially cuboid.

11. The reversible heating and cooling system of claim 9, further including:
a microprocessor operationally engaged to the battery;
a power switch attached to the housing and operationally engaged to the microprocessor, wherein the power switch is configured for being selectively switched for powering the heat pump;
a motor operationally engaged to the microprocessor;
a compressor operationally engaged to the microprocessor and the pair of heat exchangers, such that the compressor is in fluidic communication with the heat exchangers of the pair of heat exchangers;
a pair of expansion valves, each expansion valve of the pair of expansion valves being operationally engaged to the pair of heat exchangers, such that the expansion valve is in fluidic communication with both of the heat exchangers of the pair of heat exchangers;

a pair of switching valves, each switching valve of the pair of switching valves being operationally engaged the pair of heat exchangers and to the pair of expansion valves, such that the microprocessor is enabled for selectively actuating the pair of switching valves for reversing a direction of flow of a refrigerant positioned in the heat pump; and a gear train operationally engaged to the motor and to the pair of fans, such that the microprocessor is enabled for selectively actuating the motor for rotating the fans of the pair of fans for motivating air through the heat exchangers.

12. The reversible heating and cooling system of claim 11, further including a pair of dryers, each dryer of the pair of dryers being operationally engaged to a respective expansion valve of the pair of expansion valves and to a respective heat exchanger of the pair of heat exchangers.

13. The reversible heating and cooling system of claim 11, further including:
the battery being rechargeable; and
a port attached to the housing and operationally engaged to the microprocessor, such that the port is configured for insertion of a plug of a charging cord for operationally engaging the battery to a source of electrical current for charging the battery.

14. The reversible heating and cooling system of claim 11, further including:
a transceiver attached to the housing, positioned in the interior space, and operationally engaged to the microprocessor; and
programming code positioned on an electronic device of a user enabling the electronic device for signaling the microprocessor, via the transceiver, for powering up the heat pump for selectively cooling and heating the passenger compartment.

15. The reversible heating and cooling system of claim 9, wherein:
the intake vents are positioned in a top of the housing and bracket the wall; and
the outlet vents are positioned in the first end and the second end of the housing.

* * * * *